L. W. Pond,
Saw Swage.
No. 102,319.    Patented Apr. 26, 1870.
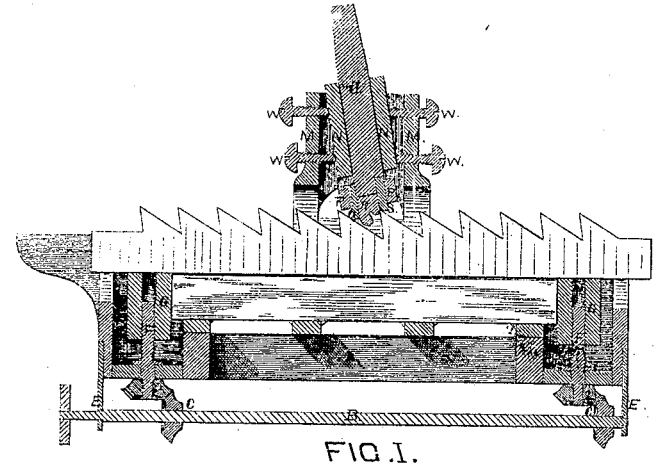
FIG. I.
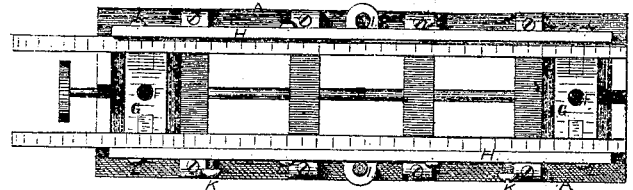
FIG. II.
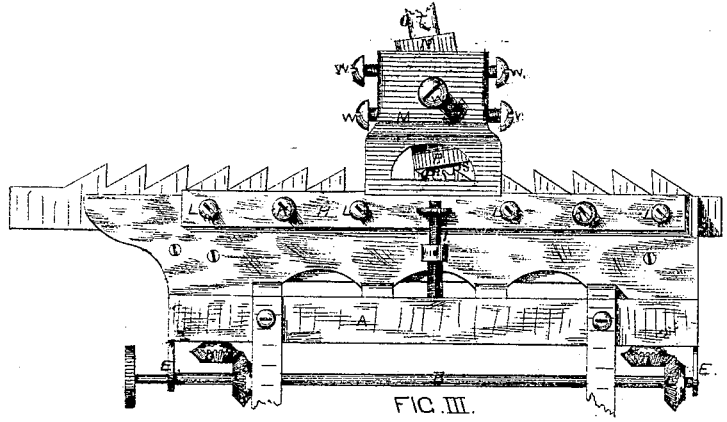
FIG. III.
WITNESS.
W. Wendell
William Hornor
INVENTOR.
Levi W. Pond
By W. B. Smith
his Atty in fact

United States Patent Office.

LEVI W. POND, OF WEST EAU CLAIRE, ASSIGNOR TO HIMSELF AND THE EAU CLAIRE LUMBER COMPANY, OF EAU CLAIRE, WISCONSIN.

Letters Patent No. 102,319, dated April 26, 1870.

IMPROVEMENT IN SAW-SWAGING MACHINE.

The Schedule referred to in these Letters Patent and making part of the same.

I, LEVI W. POND, of West Eau Claire, in the county of Eau Claire and State of Wisconsin, have invented certain Improvements in Swaging-Machines, of which the following is a specification.

Nature and Object of the Invention.

My invention relates to a machine for swaging straight saws, and finishing up the teeth to a proper pitch and width, and also for sharpening saws arranged to cut up and down.

Description of the Drawings Accompanying and Forming Part of this Specification.

Figure I is a side sectional view of my invention, with an ordinary straight saw.

Figure II, a top view.

Figure III, a side view, with a saw arranged to cut up and down.

A is the frame of the machine.

B, shaft.

C C, pinions on the shaft B.

D D, pinions meshing into pinions C C.

E E, bearings for shaft B.

F, screws, to which pinions D are attached.

G G, blocks operated by screws F.

H H, ways, on which the swaging apparatus slides.

I, a screw, with which the ways are raised and lowered.

K K, screws to screw up the saw, and hold it firmly in position.

L L L L, screws, which hold the ways in position.

M, carriage, on which the swaging apparatus is carried.

N, stock, in which the swaging apparatus is held.

O, shank to the swaging apparatus.

P, clasp, which holds the swaging-blocks.

Q, R, and S, swaging-blocks, made of steel.

Q is the wedge which holds the blocks R and S firmly in position. These blocks are so arranged that, between R and S, the point of the tooth is swaged out to the required point, and then the point of the tooth is made hooking, by the recess in block R being forced down onto it.

T, a pin in shank O, which regulates the distance the swage will fall or be forced down onto the tooth.

W, screws, which steady stock N.

The operation of this machine is, that the saw is placed upon the machine, the teeth up, and fastened; the ways are arranged by the screw I, either raised or lowered, as may be necessary, and the carriage M is placed on the ways; the pin T arranged so that when the hammer is struck on the top of the shank O, and the point of the tooth is swaged out sufficiently, and tooth after tooth is operated on; and when they have all been operated on, the saw is arranged so as to have the teeth the right height, and then the teeth have their points crooked the right pitch; and when it is desired to swage a saw that cuts up and down, the ways are taken off and turned over, and put on again, and then the center raised or lowered by the screw I, as may be necessary, and then the teeth are swaged the same as other saws, merely turning the carriage.

Claims.

I claim as my invention—

1. A saw-swage, composed of the carriage M, stock N, clasp P, swaging-blocks Q, R, and S, pin T, and set-screws W, arranged to operate as described.

2. The clamping-machine A, blocks G G, operated by screws F F, removable ways H H, set-screws K K, and screws I, arranged to operate as described.

LEVI W. POND.

Witnesses:
J. B. SMITH,
WILLIAM HORNOR.